Sept. 9, 1958     W. E. P. SCHULZ     2,851,298

RELEASABLE BALE HOOK

Filed Aug. 21, 1956

INVENTOR.
WALTER E. P. SCHULZ
BY
McMorrow, Berman + Davidson
ATTORNEYS

United States Patent Office 2,851,298
Patented Sept. 9, 1958

2,851,298

RELEASABLE BALE HOOK

Walter E. P. Schulz, Sheridan, Mont.

Application August 21, 1956, Serial No. 605,312

3 Claims. (Cl. 294—26)

This invention relates to bale hooks and more particularly to an improved bale hook which is arranged so that it can be released by a simple movement of the user's hand without requiring the user to change the position of his fingers on the handle of the bale hook as the hook is released.

A main object of the invention is to provide a novel and improved bale hook for handling bales of hay and similar materials, the improved bale hook being simple in construction, being easy to manipulate, and being reliable in operation.

A further object of the invention is to provide an improved releasable bale hook for use in handling hay and similar materials, the improved bale hook being inexpensive to manufacture, being durable in construction, and being arranged so that the user maintains the same grip on the bale hook at all times, the hook being released by a simple rotary movement of the hand wherein the fingers need not be moved.

Further objects and advantages of the invention will become apparent from the following description and claims, and from the accompanying drawings, wherein:

Figure 1:
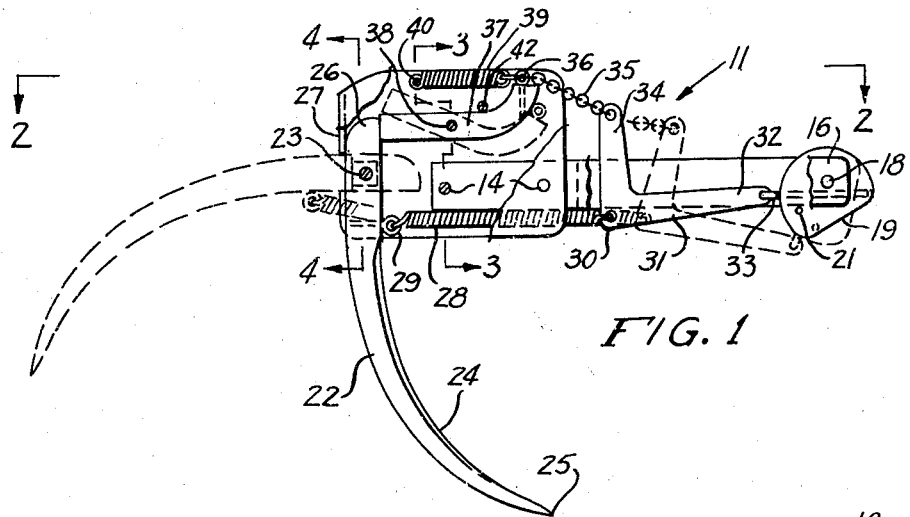
Figure 1 is a side elevational view, partly broken away, of an improved releasable bale hook constructed in accordance with the present invention.

Referring to the drawings, the improved bale hook is designated generally at 11 and comprises a pair of generally rectangular plate members 12, 12 arranged in parallel relationship and secured on opposite sides of a pair of abutting handle bar elements 13, 13, as by a pair of transversely extending rivets 14, 14. The handle bar elements 13, 13 are bent outwardly at right angles, as shown at 15, 15, the outwardly bent bar portions 15, 15 being in transverse alignment, as shown in Figure 2, and each bar portion 15 terminating in a longitudinally extending arm 16. As shown in Figure 2, the arms 16, 16 extend parallel to each other, and rotatably supported between the ends of the arms 16 is a grip member 17 of any suitable material, the grip member being rotatably mounted on a transversely extending pin 18 secured to the end portions of the arms 16, 16. As will be readily seen from Figure 1, the handle bar elements and the grip member define a handle assembly which is secured to the plate members 12, 12.

Figure 2:
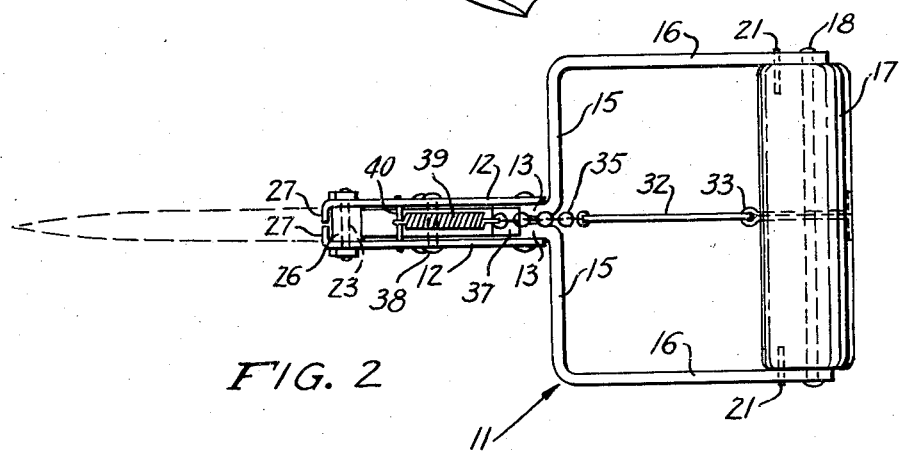
Figure 2 is a top plan view on line 2—2 of Figure 1.
Figure 3:
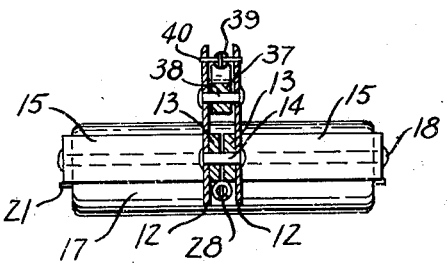
Figure 3 is a transverse vertical cross sectional view taken on line 3—3 of Figure 1.
Figure 4:
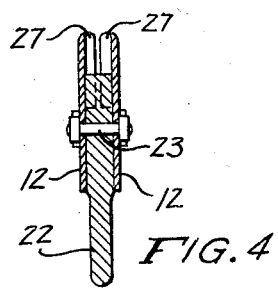
Figure 4 is a transverse vertical cross sectional view taken on line 4—4 of Figure 1.

As shown in Figures 1 and 2, the pin member 18 is somewhat eccentrically positioned with respect to the handle grip member 17, and said handle grip member is flattened at one side thereof, as shown at 19, to provide a more positive grip. Respective stop pins 21, 21 are provided on the opposite ends of the handle grip member 17, said stop pins being in alignment with each other and being located below the bottom edges of the respective arms 16, 16 so as to abut therewith and to limit clockwise rotation of the grip member 17, as viewed in Figure 1.

Designated at 22 is a generally arcuate hook element which is pivotally connected between the forward portions of the plate members 12, 12, as by a transverse rivet 23. The pivotal connection defines a first arm portion projecting outwardly from between the plate members, including the arcuate blade edge 24 and the point 25 of the hook element, and a second arm portion 26 disposed between the plate members 12, 12. The forward edges of the plate members are formed with inwardly projecting flange elements 27, 27 defining stop shoulders at their lower edges against which the hook member 22 abuts, as shown in Figure 1 in dotted view, and thereby limiting the clockwise rotation of the hook member to the position thereof shown in dotted view in Figure 1, wherein the end of a locking arm 37 is in or near sliding contact with the second arm portion 26. The hook member 22 is biased in a counterclockwise direction, as viewed in Figure 1, by a coil spring 28 which connects an eye member 29, secured to the hook member 22 a short distance from the rivet 23, to the corner portion 30 of an L-shaped link member 31. The link member 31 has one arm 32 which is pivotally connected to the intermediate portion of the grip member 17, as by a cotter pin 33 extending through the intermediate portion of the grip member and anchored therein. The L-shaped member 31 has a second arm 34 which projects upwardly, as shown in Figure 1, and which is connected by a chain 35 to an eye 36 on one end of the locking arm 37 which is pivoted at its intermediate portion between the plate members 12, 12, as by a transverse rivet 38 extending through the plate members and through the intermediate portion of the locking arm 37. A coil spring 39 connects the eye member 36 to a transverse pin 40 secured between the plate members 12, 12 and spaced forwardly from the eye member 36, thus biasing the locking arm 37 counterclockwise, as viewed in Figure 1, namely, to a position wherein the forward end of the locking arm 36 is engageable with the rear edge of the arm portion 26 of hook member 22.

Counterclockwise rotation of the locking arm 37, as viewed in Figure 1, is limited by a transverse rivet 42 secured between the plates 12, 12 and spaced rearwardly and upwardly from the pivot member 38, the stop arm 42 being engageable with the upper edge of the locking arm 37 to limit counterclockwise rotation of said locking arm, for example, to limit the movement of the locking arm 37 in a counterclockwise direction to the position thereof shown in full line view in Figure 1.

As is illustrated in Figure 1, the rear portion of the locking arm 37 is curved upwardly and rearwardly, whereby the eye element 36 on the end of the locking arm 37 is located near the top edges of the plate members 12, 12 in the normal locking position of the arm 37.

As will be readily apparent, when the grip member 17 is rotated counterclockwise, as viewed in Figure 1, the L-shaped link member 32 moves rearwardly and rotates downwardly, as shown in dotted view in Figure 1, exerting tension on the chain 35 which is transmitted to the locking arm 37, causing the locking arm 37 to be rotated clockwise, as viewed in Figure 1, to the dotted view position thereof, whereby the forward end of the locking arm 37 disengages from the arm portion 26 of hook element 22, releasing the hook element and allowing the hook element to be rotated clockwise, as viewed in Figure 1, from its full line position to its dotted line position, against the force of the biasing spring 28. Thus, when the device is used, the operator first engages the hook in the bale, and then swings the bale to an elevated position, and then merely rotates the handle element 17 in a counterclockwise direction, as viewed in Figure 1, without changing the position of his fingers on the grip member 17, releasing the hook element 22 and allowing the bale to be tossed upwardly, free of the bale hook. This allows a bale to be lifted and swung in a single continuous movement, without requiring the user to change his grip on the handle element 17. After the bale has been released, the operator merely lowers the bale hook, allowing the hook element 22 to resume its normal position under the biasing action of the spring 28, and allows the locking arm 37 to return to its full line locking position, shown in Figure 1, whereupon the operation can be repeated.

While a specific embodiment of an improved releasable bale hook has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A bale hook comprising a pair of plate members, respective handle bar members secured to said plate members, a hook element pivoted between said plate members and having a first arm portion projecting outwardly from between said plate members and having a second arm portion disposed between said plate members, said arm portions being located at opposite sides of the pivotal connection of the hook element, a locking arm pivoted between said plate members and having one end portion at times lockingly engageable with said second arm portion to hold the first arm portion in a laterally extending position with respect to said plate members, spring means biasing said first arm portion toward said laterally extending position, a handle grip member rotatably secured between said handle bar member, a rigid release link pivoted to said handle grip member, and flexible means connecting said release link to said locking arm and being formed and arranged to rotate said locking arm responsive to rotation of said release link by said grip member.

2. A bale hook comprising a pair of plate members, a hook element pivoted between said plate members and having a first arm portion projecting outwardly from between said plate members and having a second arm portion disposed between said plate members, said arm portions being located on opposite sides of the pivotal connection of the hook element, a locking arm pivoted between said plate members and having one end portion at times lockingly engageable with said second arm portion to hold the first arm portion in a laterally extending position with respect to said plate members, spring means biasing said first arm portion toward said laterally extending position, a handle assembly secured between said handle bar members, said handle assembly including a transverse extending rotatable grip element, a rigid release link, means pivotally connecting said release link to the intermediate portion of said grip element, means connecting said release link to said locking arm and being formed and arranged to rotate said locking arm responsive to rotation of said grip element.

3. A bale hook comprising a pair of plate members, a hook element pivoted between said plate members and having a first arm portion projecting outwardly from between said plate members and having a second arm portion disposed between said plate members, said arm portions being located on opposite sides of the pivotal connection of the hook element, a locking arm pivoted between said plate members and having one end portion at times lockingly engageable with said second arm portion to hold the first arm portion in a laterally extending position with respect to said plate members, spring means biasing said first arm portion toward said laterally extending position, a handle assembly secured to said plate members, said handle assembly comprising a pair of parallel handle bar members and a grip element rotatably mounted between said handle bar members, a rigid release link means pivotally connecting said release link to the intermediate portion of said grip element, spring means biasing said locking arm for locking interengagement with said second arm portion, and flexible means connecting said release link to said locking arm and being formed and arranged to rotate said locking arm to a position disengaging from said second arm portion responsive to rotation of said grip element.

References Cited in the file of this patent

UNITED STATES PATENTS

| | | |
|---|---|---|
| 1,180,196 | Schepp | Apr. 18, 1916 |
| 2,138,694 | Daugherty | Nov. 29, 1938 |
| 2,575,986 | Yoder | Nov. 20, 1951 |
| 2,628,857 | Nelson | Feb. 17, 1953 |
| 2,772,111 | Eide | Nov. 27, 1956 |